(12) United States Patent
Agostini et al.

(10) Patent No.: US 11,012,595 B2
(45) Date of Patent: May 18, 2021

(54) AUGMENTED REALITY

(71) Applicant: Alchemy Systems, L.P., Austin, TX (US)

(72) Inventors: Ric Agostini, Cambridge (CA); Scott Lang, Cambridge (CA); Kimberly-Anne Larmond, Guelph (CA); Scott Martin, Erin (CA); Terence Patrick McGuire, Waterloo (CA); Salvatore Scozzari, Ancaster (CA)

(73) Assignee: Alchemy Systems, L.P., Austin, TX (US)

( * ) Notice: Subject to any disclaimer, the term of this patent is extended or adjusted under 35 U.S.C. 154(b) by 145 days.

(21) Appl. No.: 15/065,736

(22) Filed: Mar. 9, 2016

(65) Prior Publication Data

US 2016/0267808 A1 Sep. 15, 2016

Related U.S. Application Data

(60) Provisional application No. 62/130,391, filed on Mar. 9, 2015.

(51) Int. Cl.
*H04N 5/225* (2006.01)
*G09B 5/06* (2006.01)
(Continued)

(52) U.S. Cl.
CPC ......... *H04N 5/225* (2013.01); *G06K 9/00671* (2013.01); *G06T 11/60* (2013.01);
(Continued)

(58) Field of Classification Search
CPC .. B25J 9/16; G06N 3/08; H04N 5/225; H04N 5/272; G06K 9/00671; G06T 11/60; G06T 19/006; G09B 5/06; G09B 7/08
See application file for complete search history.

(56) References Cited

U.S. PATENT DOCUMENTS

| | | | |
|---|---|---|---|
| 2005/0289590 A1* | 12/2005 | Cheok | H04N 21/4781 725/37 |
| 2008/0050711 A1* | 2/2008 | Doswell | G09B 23/28 434/350 |

(Continued)

OTHER PUBLICATIONS

Webel et al., An augmented reality training platform for assembly and maintenance skills, Nov. 1, 2012, Robotices and Automomous Systems 61, pp. 398-403 (referred to as pp. 1-6).*

*Primary Examiner* — Malina D. Blaise
(74) *Attorney, Agent, or Firm* — Jack D. Stone, Jr.; Scheef & Stone, L.L.P.

(57) ABSTRACT

In a method and system of training, one or more digital assets, such as two-dimensional and three-dimensional computer-generated objects, are superimposed over a live camera view to generate a simulated training scenario, referred to herein as augmented reality ("AR") technology. By leveraging AR technology, a live simulation of real-world events, situations, and skills is generated for which an employee, student, customer, or any type of person in need of training, is being trained. A trainee is thus immersed directly into the training material. The physical environment and working conditions are integrated into the sequence of training material, and it does this live, that is, with immediate feedback from a camera's live screen view. This technique may, by way of examples, also be described as an automated guided tour used to facilitate employee on-boarding and training, or as a guided tour through a warehouse store for its customers.

21 Claims, 7 Drawing Sheets

(51) Int. Cl.
*G09B 7/08* (2006.01)
*G06T 19/00* (2011.01)
*G06T 11/60* (2006.01)
*G06K 9/00* (2006.01)
*H04N 5/272* (2006.01)

(52) U.S. Cl.
CPC .............. *G06T 19/006* (2013.01); *G09B 5/06* (2013.01); *G09B 7/08* (2013.01); *H04N 5/272* (2013.01)

(56) References Cited

U.S. PATENT DOCUMENTS

| | | | |
|---|---|---|---|
| 2014/0028712 A1 | 1/2014 | Keating et al. | |
| 2014/0063055 A1* | 3/2014 | Osterhout | G06F 3/165 345/633 |
| 2014/0119593 A1* | 5/2014 | Filler | G06T 7/73 382/100 |
| 2014/0171039 A1* | 6/2014 | Bjontegard | H04L 67/38 455/414.1 |
| 2014/0176603 A1 | 6/2014 | Kumar et al. | |
| 2014/0285684 A1* | 9/2014 | Huang | H04N 1/00875 348/223.1 |
| 2015/0049004 A1* | 2/2015 | Deering | G02B 27/0093 345/8 |
| 2015/0109338 A1* | 4/2015 | McKinnon | G06F 16/50 345/633 |
| 2015/0187138 A1* | 7/2015 | Mullins | G06T 19/006 345/633 |
| 2015/0310667 A1* | 10/2015 | Young | G09G 5/003 345/633 |
| 2015/0332515 A1* | 11/2015 | Elmekies | G06F 3/017 345/419 |
| 2016/0026853 A1* | 1/2016 | Wexler | G06F 3/005 382/103 |
| 2016/0049005 A1* | 2/2016 | Mullins | G06K 9/66 345/420 |
| 2016/0191887 A1* | 6/2016 | Casas | H04N 13/279 348/47 |
| 2016/0249989 A1* | 9/2016 | Devam | G09B 23/285 345/633 |
| 2016/0269631 A1* | 9/2016 | Jiang | G09B 5/02 |
| 2016/0358383 A1* | 12/2016 | Gauglitz | G06T 19/006 |
| 2017/0042631 A1* | 2/2017 | Doo | H04N 13/344 |
| 2017/0056115 A1* | 3/2017 | Corndorf | G16Z 99/00 |
| 2017/0086695 A1* | 3/2017 | Mullins | A61B 5/316 |
| 2017/0103581 A1* | 4/2017 | Mullins | G06K 9/4652 |
| 2017/0168566 A1* | 6/2017 | Osterhout | G06F 3/0488 |
| 2017/0236407 A1* | 8/2017 | Rhoads | H04N 5/23219 455/420 |
| 2017/0249745 A1* | 8/2017 | Fiala | G02B 27/0093 |
| 2017/0252108 A1* | 9/2017 | Rios | G16H 40/63 |
| 2017/0255648 A1* | 9/2017 | Dube | G06K 9/6201 |
| 2017/0277559 A1* | 9/2017 | Mullins | G06F 3/011 |
| 2017/0280188 A1* | 9/2017 | Mullins | H04N 21/242 |
| 2017/0286786 A1* | 10/2017 | Nick | G16H 40/67 |
| 2017/0344114 A1* | 11/2017 | Osterhout | G06F 3/04815 |
| 2017/0352192 A1* | 12/2017 | Petrovskaya | G02B 7/36 |
| 2017/0359570 A1* | 12/2017 | Holzer | H04N 13/349 |

* cited by examiner

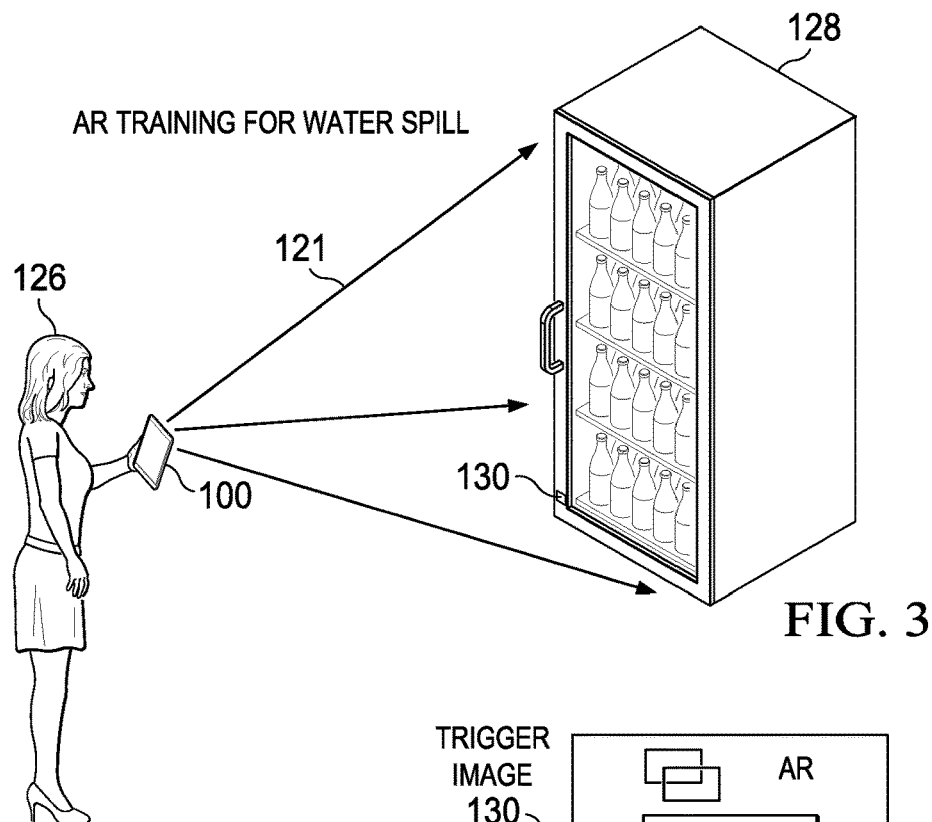
FIG. 3
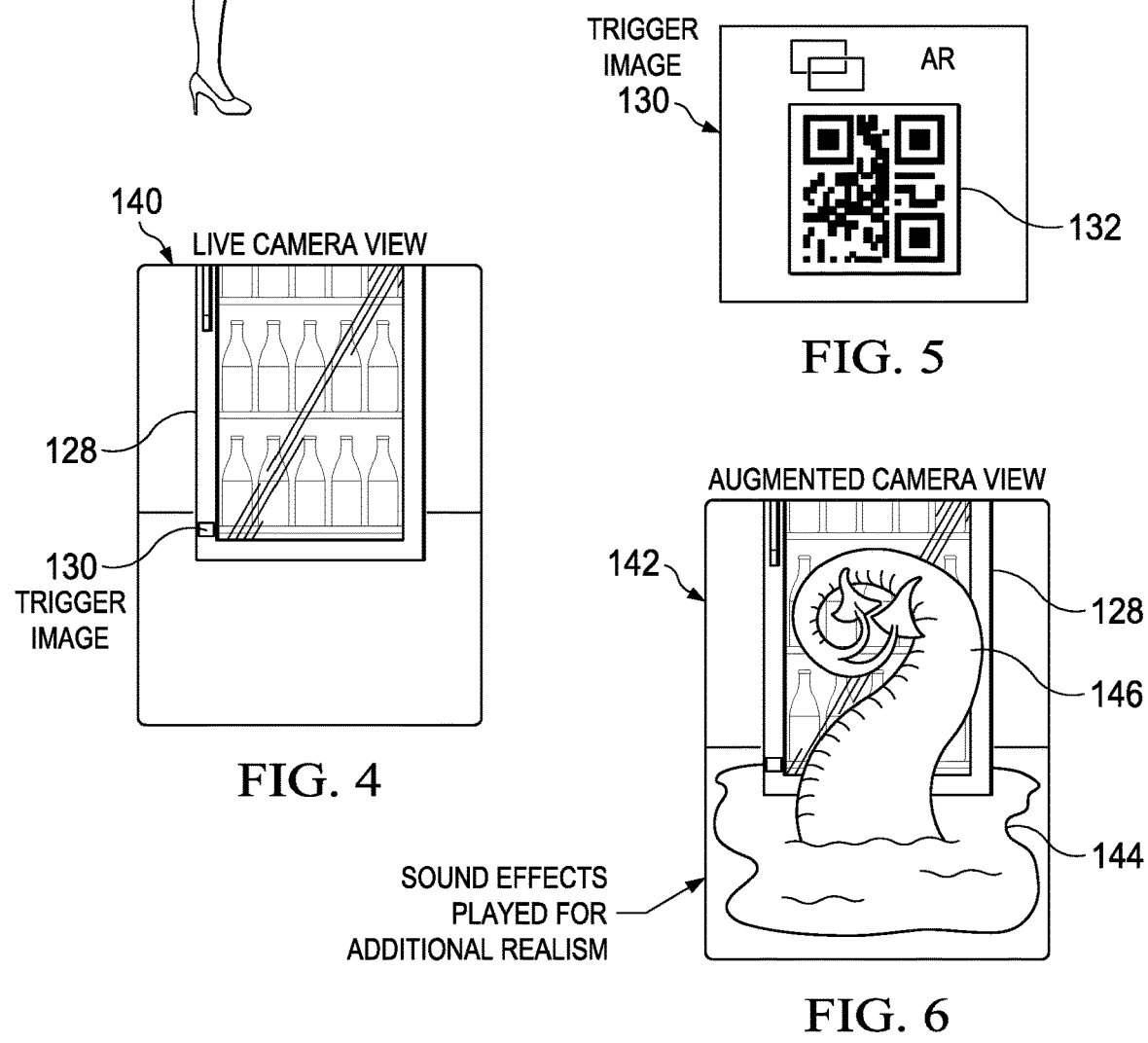
FIG. 4
FIG. 5
FIG. 6

AUGMENTED REALITY

CROSS-REFERENCE TO RELATED APPLICATIONS

This application claims the benefit of U.S. Provisional Application No. 62/130,391, filed Mar. 9, 2015, which application is hereby incorporated herein by reference, in its entirety.

TECHNICAL FIELD

The invention relates generally to training and, more particularly, to using augmented reality to enhance the impact and effectiveness of training of persons, such as employees, customers, students, and any person or persons in need of training.

BACKGROUND

Retailers and manufacturers are two sectors of the economy that rely on acquiring and retaining a substantial number of unskilled employees required to perform various operations. One of the key challenges in bringing on such employees is to provide them with the knowledge and understanding required to perform their new jobs safely and effectively. One of the key strategies used to provide this knowledge is through the use of training tools such as written training material, classroom group-based-training, one-on-one training with a supervisor, and on-line training using text, video, photography, and electronic quizzes. Each of these techniques suffers from limitations of effectiveness, such as (1) high cost (including direct cost and/or time spent away from one's job duties), (2) low relevance (e.g., images or videos that are not specific to a respective industry or environment, or that do not, for example, accurately and/or realistically portray dangerous situations), and (3) low impact (e.g., information is not retained for much time after delivery to an employee). These limitations also apply to other types of trainees such as customers shopping in warehouse stores, students enrolled in technical courses (i.e., welding, electrical), or any person in need of training.

Therefore, what is needed is a system and method for training people, such as employees, customers, and students, that is cost effective, relevant, and that will have a lasting impact on an employee's performance.

SUMMARY

The present invention, accordingly, solves these problems in a unique and compelling manner by superimposing one or more digital assets, such as two-dimensional and three-dimensional computer-generated objects, over a live camera view to generate a simulated training scenario, referred to herein as augmented reality ("AR"). By leveraging AR technology, a live simulation is generated of real-world events, situations, and skills for which a person is being trained. In effect, a person is immersed directly into the training material. The physical environment and working conditions are integrated into the sequence of training material, and it does this live, that is, with immediate feedback from a camera's live screen view. This technique may also be described as an automated guided tour used to facilitate employee on-boarding and student training.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 exemplifies a camera view of a juice storage bin of FIG. 1;

FIG. 4 depicts a live camera view of FIG. 3;

FIG. 5 exemplifies a trigger image of FIGS. 3 and 4;

FIG. 6 exemplifies an augmented camera view of the live camera view of FIG. 4;

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

It is noted that, unless indicated otherwise, functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention. Such a person having ordinary skill in the art would be able to make use of commercially-available software tools, components, and libraries to build a software application that implements the system being described.

Figure 1:
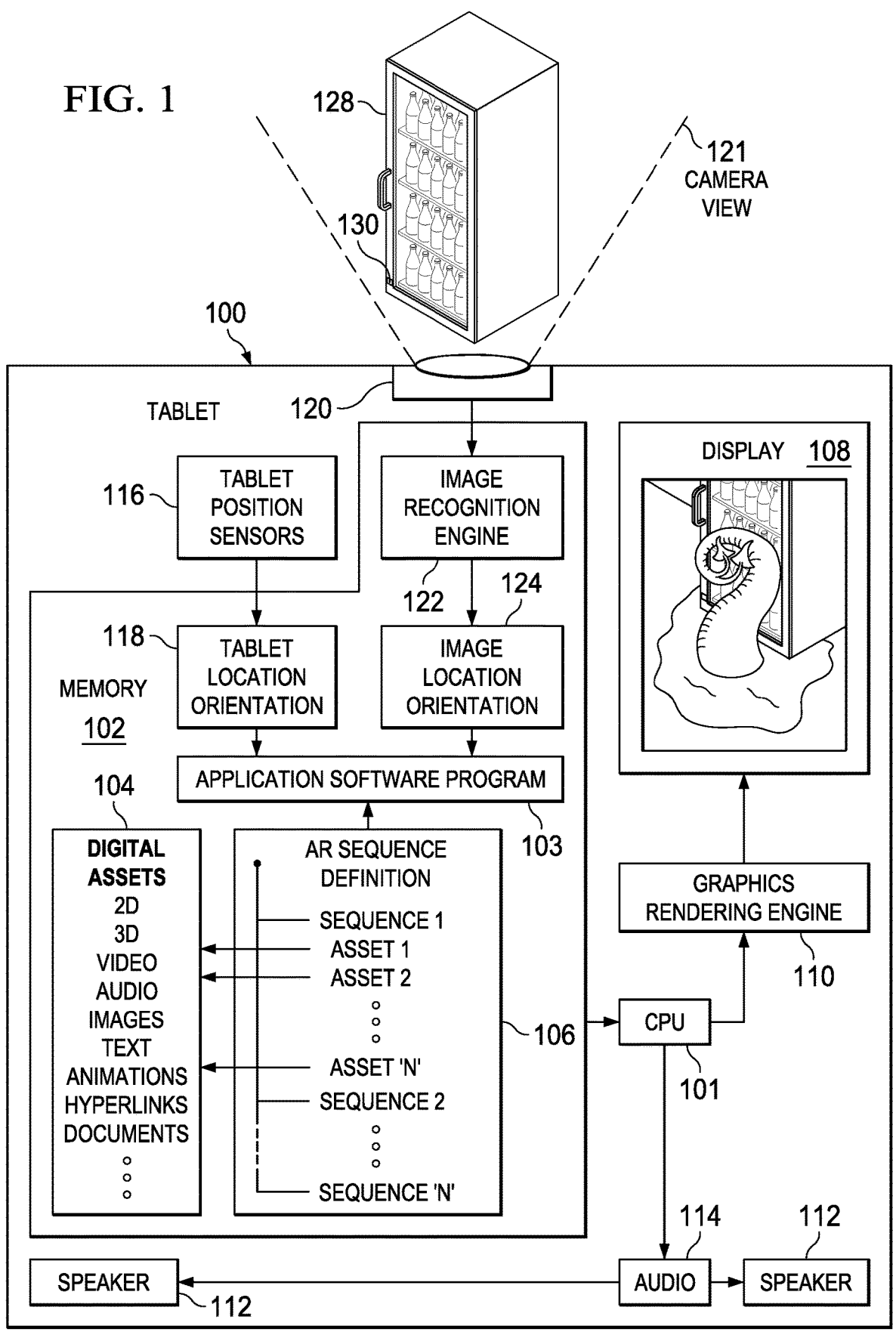
FIG. 1 exemplifies a schematic overview of software architecture and features of the present invention.

Referring to FIG. 1 of the drawings, the reference numeral 100 generally designates a mobile computing device, represented herein as a tablet, configured to embody features of the present invention. The tablet 100 includes a central processing unit (also referred to herein as a "CPU" or "processor") 101 coupled to a memory 102 having an application software program 103 executable by processor 101 for training persons, as described in further detail below. A display 108 is coupled via a graphics rendering engine 110 to CPU 101. Display 108 may include a display built into tablet 100 or alternative displays, such as an optical head-mounted display (OHMD, e.g., Google Glass) or the like. One or more speakers 112 are preferably coupled via audio hardware 114 to CPU 101.

Tablet 100 includes position sensors 116, such as gyroscopes, which are effective for generating data indicative of the location and orientation of tablet 100 relative to the target image, or object, 128. Position sensors 116 are coupled (through CPU 101) to memory 102 for inputting the position data to tablet location orientation software module 118 which is run by CPU 101 through application software program 103 for determining the location and orientation of tablet 100 relative to the target image, or object, 128, and saving that information into the memory 102. A camera 120 is mounted on tablet 100 for capturing a camera view 121, preferably live, of an object 128, exemplified as a juice storage bin having a trigger image 130 and the object's environment, and for generating image data indicative of camera view 121 captured by the camera. Camera 120 is coupled (through CPU 101) to memory 102 for inputting the image data to an image recognition software engine 122 which generates an image signal to an image location orientation software module 124, which is run by CPU 101 through application software program 103 for determining the position and orientation of object 128 of the image and saving that information into the memory 102. By way of example, with location and orientation of the tablet and target image determined, if the tablet is three feet away from the target image 128, then the 3D object (augmentation) is rendered a certain size. If the tablet is further from the target image, then the 3D object is rendered smaller in size, just like a real object. With respect to orientation, if the tablet is above the target image, the augmentation is rendered as if looking down at the target image from above. If the tablet is looking at the target image from the side, then the augmentation is rendered as if looking at that side of the target image. It is understood that FIG. 1 is a schematic drawing and, as such, camera 120 and tablet position sensors 116 are actually coupled to memory 102 through the CPU 101.

As further shown in FIG. 1, in memory 102, application software program 103 is operative with AR sequence definitions 106, which are training programs designed for a specific purpose or job role. By way of example, but not limitation, AR sequence definitions may be designed for "New Employee Training at Retail Grocery" or "Poultry Processing Employee Training." Each AR sequence definition 106 comprises a number of sequences, also known as lessons, such as "How to properly clean a deli slicer" or "How (and why) to clean up a water spill"). Each sequence, or lesson, comprises one or more steps, each of which steps comprises one or more digital media, or assets, 104.

Digital assets 104 include one or more of 2D and 3D objects, audio clips (e.g., of human voice instructions or procedures, sample sounds of machinery or devices, music, and the like), video clips (e.g., of instructions, procedures, dramatizations of problems or incidents, corporate messaging, and the like), static images (e.g., of technical drawings, depictions or photographs of machinery, equipment, illustrations, photographs of problems of incidents, and the like), text data (e.g., of instructions, procedures, statistics, and the like), animations (e.g., of instructions, procedures, and the like), hyperlinks (e.g., to documentation, reports, external applications, and the like), and any other types of digital media.

Figure 2:
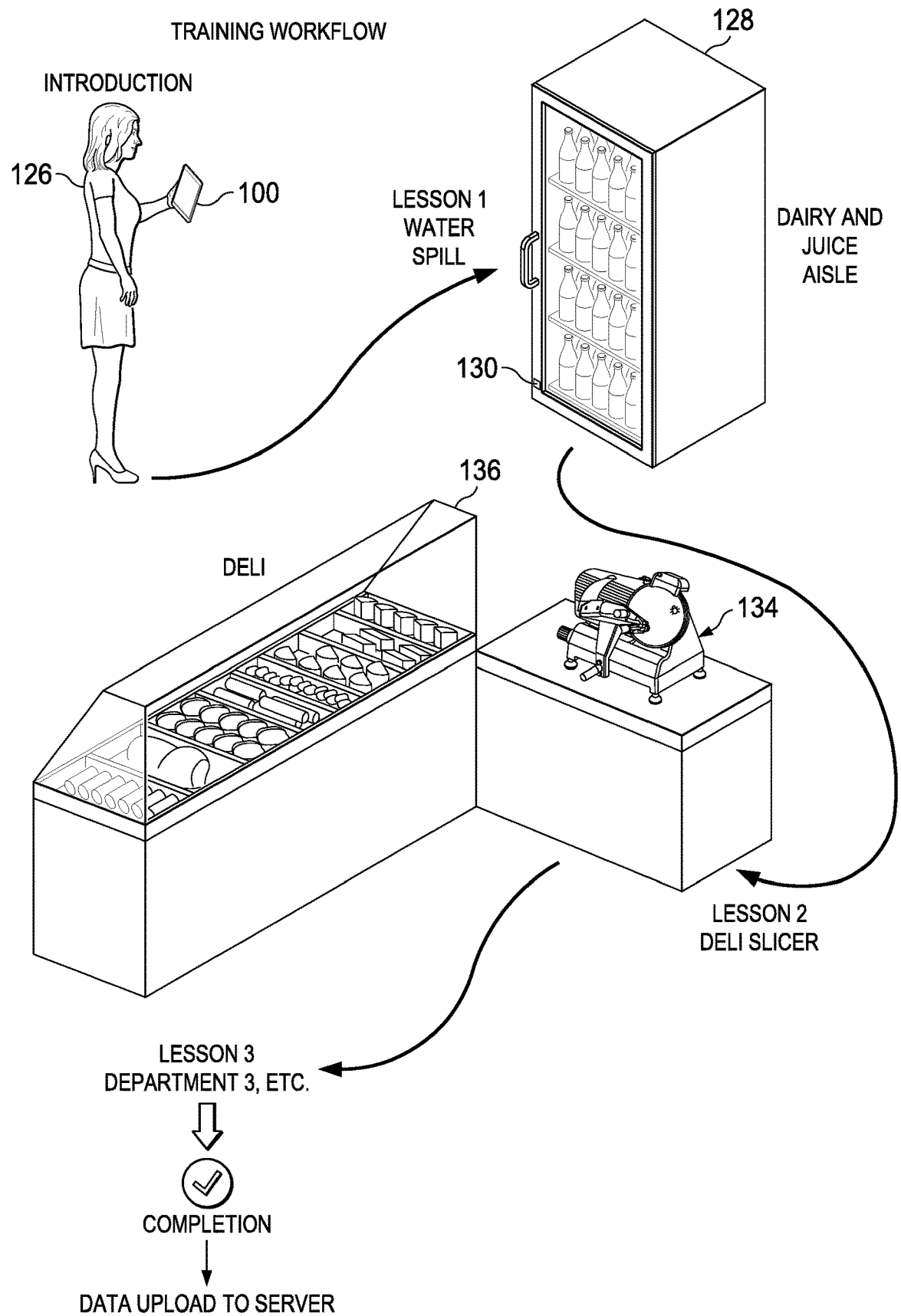
FIG. 2 exemplifies a training session of the system of FIG. 1, the session having a number of lessons.

FIG. 2 of the drawings exemplifies an overview of the system of FIG. 1 for executing a training session having a number of lessons. The system is configured for training an employee 126, also referred to herein as a trainee, having tablet 100 configured to instruct the trainee to start the training application and follow the instructions that appear on the screen of the tablet. This is one specific example of the application of this technology to provide an effective on-boarding program to new employees of a retail grocery store.

As shown in FIG. 2, the application preferably instructs employee 126 to go to a specific location in the work environment. The location could be a site of a particular machine, piece of equipment, or component of a process. The employee walks to that particular location in the work environment. The employee is preferably not accompanied by a manager, supervisor, or any other employee. The employee preferably proceeds through the lesson in a self-guided manner. As exemplified in FIG. 2, and discussed in further detail below with respect to FIGS. 3-9, the exemplified training session includes a number of lessons, such as how to respond to a water spill (lesson 1), how to handle bacterial growth on a deli slicer 134 (lesson 2), and the like.

Referring to FIGS. 3-5, as employee 126 reaches the required location for training, tablet 100 training application software program 103 preferably displays on display 108 a live camera view 140 (FIG. 4) and instructs employee 126 to look for a trigger image 130 (FIG. 5) having a particular pre-defined trigger image tag 132 that is attached to some part of the equipment. Image tag 132 is preferably a barcode, a QR code, a customer's store logo, or any kind of uniquely identifiable image that may reside on a sticker or label visibly applied to equipment that is the object of training.

Figure 7:
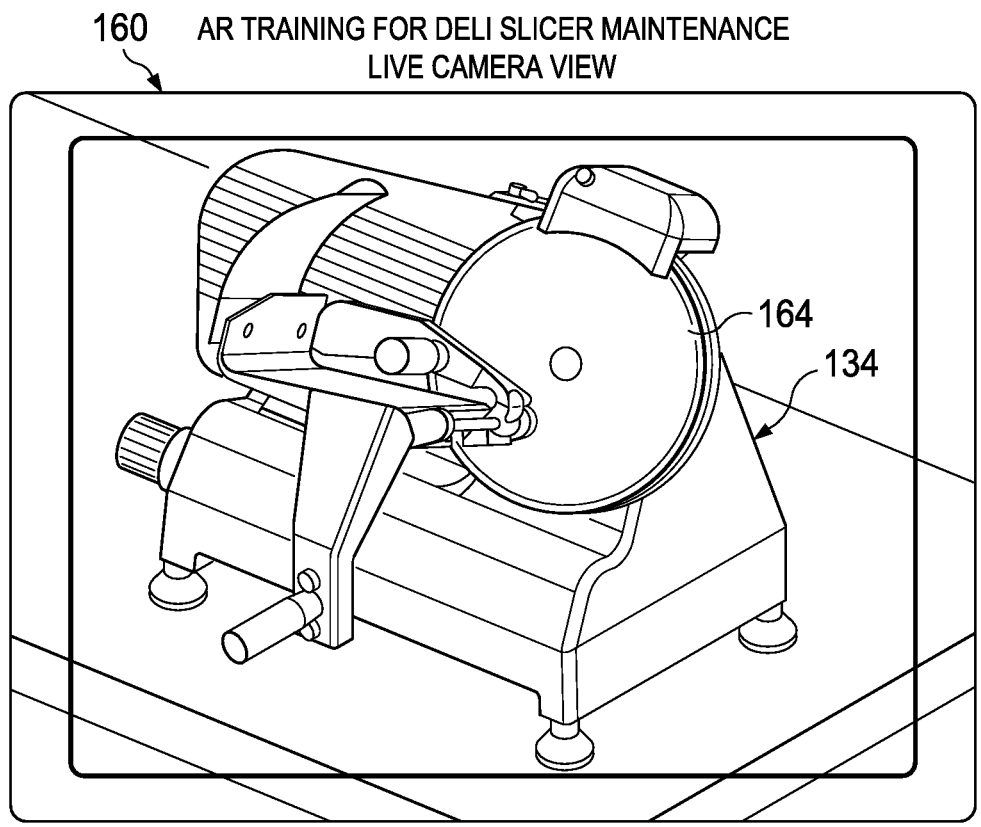
FIG. 7 shows a live camera view exemplified in an additional application of the invention.
Figure 8:
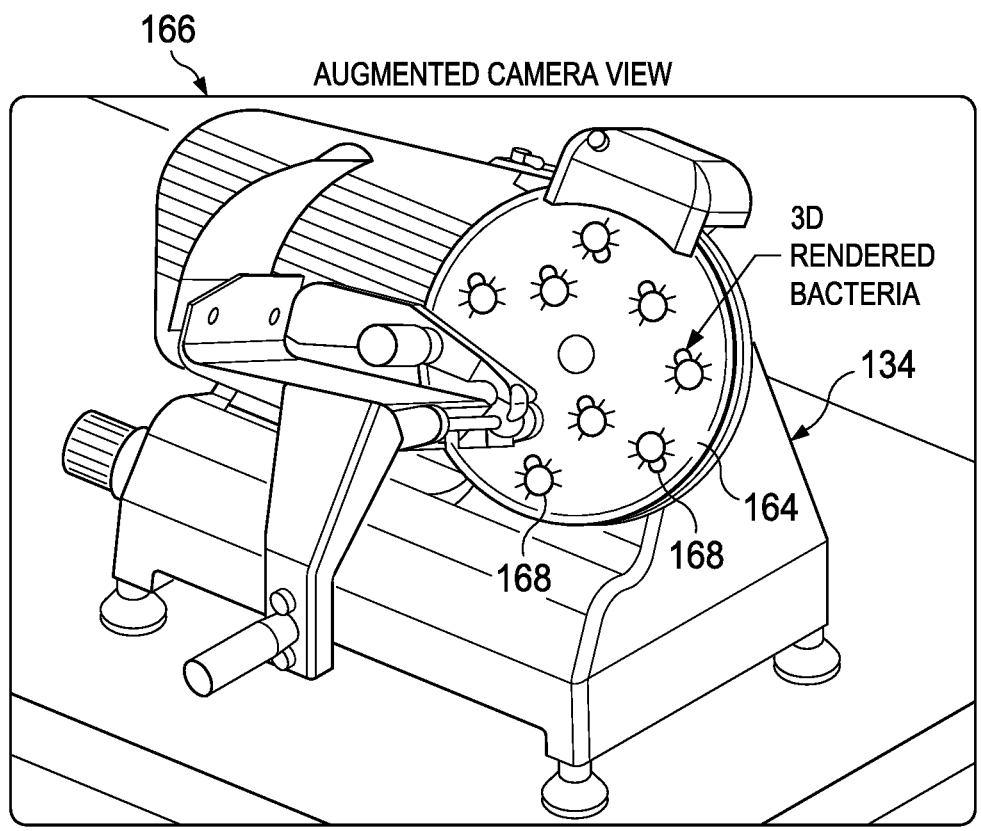
FIG. 8 exemplifies an augmented camera view of the live camera view of FIG. 8.
Figure 9:
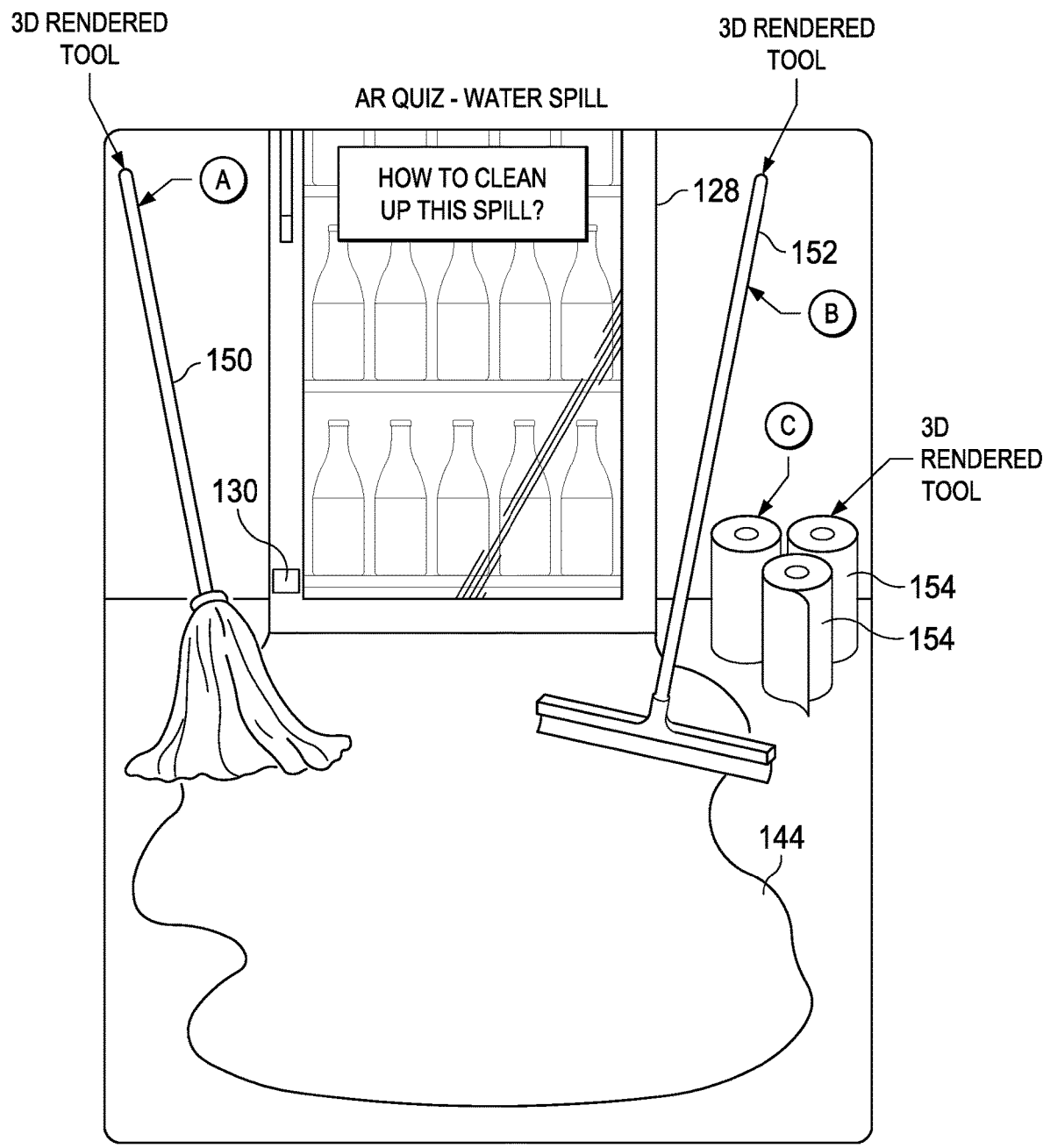
FIG. 9 exemplifies a quiz subsequent to the lesson of FIGS. 3-8.

Once the training application software program 103 detects image tag 132 in the camera's live view 140, the training application program preferably generates an AR overlay 142, using 3D renderings 144 and 146 selected from digital assets 104, on top of the camera view 121 (FIG. 6) that the trainee views on display 108. The AR overlay 142 preferably comprises digital assets 104, including images, text, video, 3D renderings, sound effects, vibration, animated 3D renderings, and/or the like. By using the AR overlay elements, digital assets 104, the training application software program 103 provides a training sequence, or lesson, that incorporates elements of the live camera view 140 of the trainee's environment to teach the subject matter of the lesson. It may be appreciated that the invention can provide a simulation and impact of an unsafe, threatening, and/or costly situation, or of a complex, multi-step procedure, without the cost or actual exposure to the employee of those actual conditions. By way of examples, but not limitations, such training sequences, or lessons may include:

1. A water spill on the floor next to some type of cooling equipment. This is exemplified in FIGS. 1-5, wherein a water-monster tentacle 146 (FIG. 6) is animated reaching up through a puddle 144 to threaten an employee. In the case of the water spill, the system can render multiple tools, as exemplified in FIG. 9, that could be used to clean up the spill, such as a mop, paper towels, squeegee, etc. These tools are preferably rendered in proportionate scale and proper orientation relative to actual objects in the physical environment, enhancing the realism of the training exercise;

2. A contaminated piece of food cutting equipment. By way of example, a deli slicer 134, shown as clean in FIGS. 2 and 7, is rendered in FIG. 8 with bacteria on the surface of the cutting blade 164 greatly magnified to make the bacteria visible to the eye.

3. A theft in progress in a retail environment can be simulated much more cost-effectively than a training exercise setup that involves other employees or paid actors.

4. A fire in a chemical storage cabinet.

5. An event external to the work environment, such as a dangerous weather event or loss of power.

6. A multi-step procedure to safely disassemble, clean, and reassemble a commercial-quality electric deli meat slicer.

7. Spills of poisonous liquids.

8. Broken glass on a floor.

9. Contaminated food.

10. Confined spaces.

11. Equipment accidents and failures.

12. A simulation, or 3D rendering, of equipment to train on that is not present in the trainee's work environment for various reasons, such as the equipment being only occasionally available or usable, out for repairs, the equipment being rental equipment, or the like.

By integrating sounds, sights, and conditions of the actual work environment into the simulation, the simulation becomes as realistic as possible, and is therefore much more effective in achieving suspension of disbelief. It is more convincing to the trainee that they are actually seeing the event happen in front of them and that they are actively participating in it, instead of merely watching it passively from a distance and at a different time. In the above example of a theft in progress in a retail environment, the trainee sees for him or herself the complexity of a theft situation when there are other employees and even customers in the same environment that could be affected by the situation at hand. In such a case, the trainee is much more likely to be emotionally invested in the situation, and to be deeply motivated to pay attention to the lesson being taught and especially to the remedies and solutions that the training provides.

Depending on the specific lesson, the AR digital assets 104 can be used to simulate the tools and techniques required to help remedy the situation in the lesson being taught.

Figure 10:
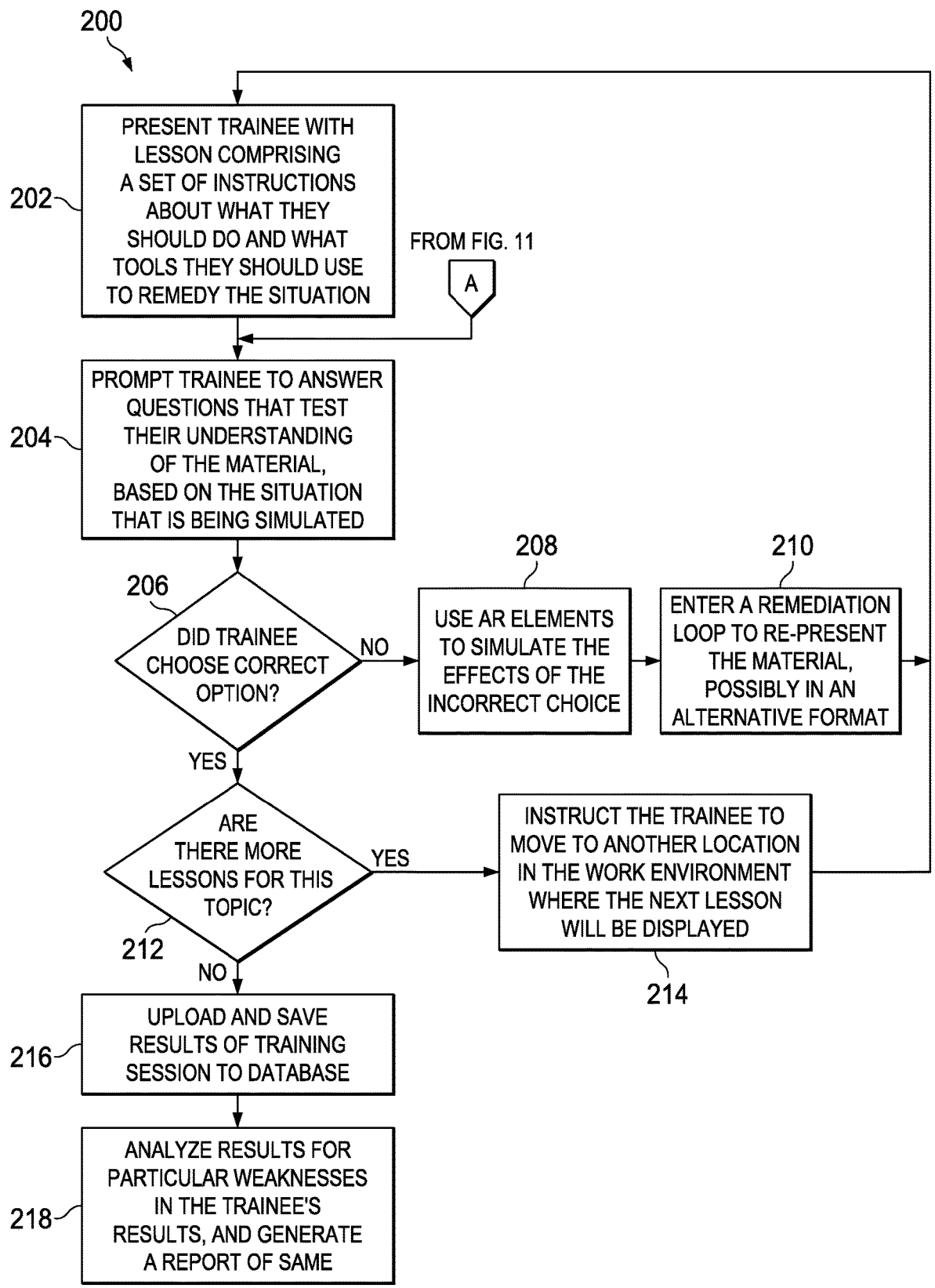
FIG. 10 depicts a flow chart of steps executable in accordance with the invention for training.
Figure 11:
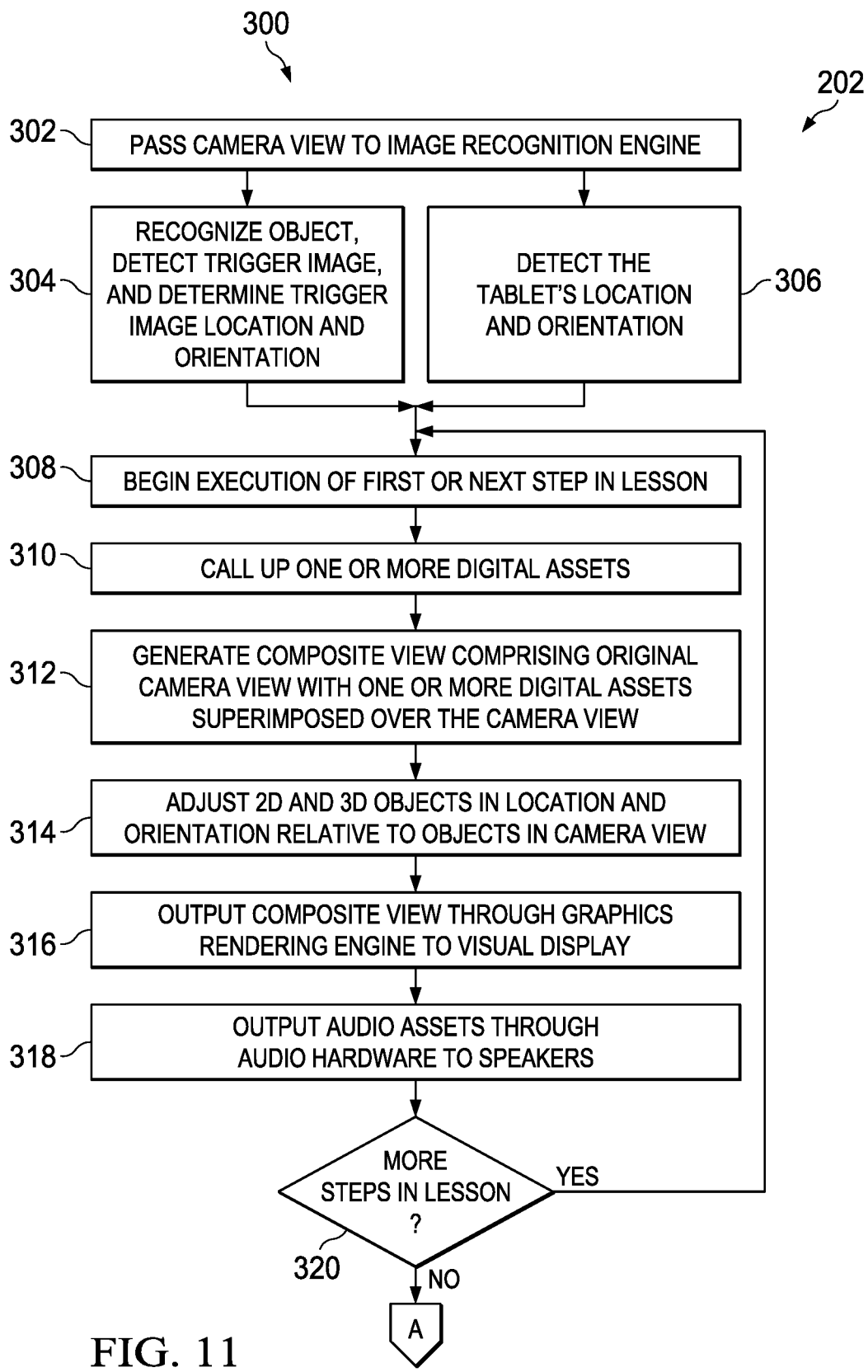
FIG. 11 depicts a flow chart of steps executable in accordance with the invention for displaying a training situation.

Operation of the system is exemplified by flow charts 200 and 300, depicted in FIGS. 10 and 11, respectively. Accordingly, in step 202 of FIG. 10, a trainee is presented with a set of instructions about what they should do and what tools they should use to remedy the situation, as discussed in further detail in the following, with respect to FIG. 11.

Referring to FIG. 11, in operation, at steps 302 and 304, camera view 121 is passed to the image recognition engine 122 which recognizes object 128 and detects a trigger image 130, determines the trigger image's location and orientation, which location and orientation is fixed, and passes that information to application software program 103. At substantially the same time, at step 306, the tablet's position sensors 116 and location and orientation module 118 provide the location and orientation of the tablet and target image 128, and passes that information to program 103. When both the trigger image's fixed location and orientation as well as the tablet's location and orientation are known, at step 308, execution by program 103 of the AR sequence definition 106 begins.

Execution of the AR sequence definition, or lesson, 106 comprises a series of one or more steps in the AR training course, each of which steps calls up one or more digital assets 104. Execution of the first step or next step in the series of steps begins at step 310. As shown at step 312, each step of the execution generates a composite visual output comprising the original camera view 121, with one or more of the above digital assets 104 superimposed over the camera view and, at step 314, the 2D and 3D objects are adjusted in location and orientation such that their apparent position orientation remains fixed with respect to the physical objects in the scene. At step 316, the composite view is passed on to the graphics rendering engine 118 of the tablet and is output to the tablet's visual display 108. At step 318, audio assets 104 are sent to the audio hardware 114 to be played on the tablet's speakers 112 in coordinated sequence with the visual objects. At step 320, a determination is made whether there are more steps in the lesson. If there are more steps, execution returns to step 308 to thereby guide the trainee from one step to the next, in exactly the correct order as required by the procedure and as built into the application software program 103 and AR sequence definition 106. If there are no further steps for this lesson, execution proceeds to step 204 of FIG. 10.

At step 204, the trainee is given a quiz (e.g., FIG. 9) and prompted to answer one or more questions that test their understanding of the material of the lesson, based on the situation that is being simulated. Such questions may include 3D-rendered objects that simulate options available to address a problem of a given situation. Questions may even include multiple correct choices, each of which may reduce or eliminate the problem, and not necessarily in the same way as other correct options.

At step 206, if the trainee chooses an incorrect option, execution proceeds to step 208 wherein the AR digital assets 104 are preferably used to simulate the effects of the incorrect choice. The effects could be that the problem does not get remedied, or the problem gets even worse, or a new and possibly more dangerous problem is created. 3D animated renderings and audio effects may be generated to simulate the result of an incorrect choice in a multiple-choice question, and illustrate to the trainee how an incorrect choice either has no effect on a problem, or causes the problem to get worse, or causes another, potentially worse problem to arise.

At step 210, the application returns to step 202 and enters a remediation loop to re-present the material, possibly in an alternative format, order, or style, preferably adapting to the user's personal learning style and preferences, to reinforce the required lesson.

If at step 206, a trainee correctly answers the one or more questions, that lesson is counted as complete and, optionally, 3D animated renderings and audio effects are displayed to simulate the result of one or more correct responses and illustrate to the trainee how one or more correct responses cause the problem to be solved or ill effects to be minimized. A determination is then made at step 212 whether there are more lessons for the topic at hand. If it is determined that there are more lessons, execution proceeds to step 214, wherein the application instructs the trainee to move to another location in the work environment where the next lesson will be displayed. For example, with reference to FIG. 2, a trainee may move from lesson 1 to lesson 2. Execution then returns to step 202. The trainee thus moves through a series of lessons as described above that comprise the set of lessons required for a specific topic.

If, at step 212, it is determined that there are no more lessons to cover, then at step 216, the application software program 103 will store as many lessons as necessary for a specific topic. After visiting all of the image tags and completing the sequence of lessons, the trainee completes the training session.

At step 218, the results of the training are uploaded to a cloud-based service and stored. The results are then analyzed for particular weaknesses in the trainee's results. A report is then generated for the trainee's supervisor. The report will direct a supervisor to provide, if necessary, further remedial training by means of a talk for the specific areas of weakness. No remedial actions are generated or suggested for topics for which the trainee exhibited satisfactory results.

Optionally, upon completion of the entire sequence of steps, the final result of the procedure may be simulated as a set of 3D renderings and audio effects and the like superimposed on the live view, the audio effects being played through the speakers incorporated into the mobile computing device, thereby providing positive feedback to the trainee.

It is understood that the present invention may take many forms and embodiments. Accordingly, several variations may be made in the foregoing without departing from the spirit or the scope of the invention. For example, the training system and method may be configured to adapt to incorrect choices and an employee's learning style and preferences. In another example, instructions and orientation may be auditory, that is, verbal. In still another example, the system and method may be used to screen or weed out high-risk candidates (e.g., based on a report of results in step 218) before they are hired. In yet another example, the application may be completely self-contained, without any capability to upload data to a cloud-based or server-based central application, but instead contains within itself additional functions to generate reports and summaries for supervisor or instructor review.

By use of the present invention, an automated training system provides on-boarding and continuous learning, using a built-as-a-mobile-application which a trainee can use and follow completely on their own with little or no supervision or guidance. The relevance, effectiveness, and impact of the teaching material is enhanced, while training costs are reduced.

Further, training lessons are made more realistic by incorporating elements of the actual physical environment into the lesson, wherein elements include at least one of objects or equipment, employees, customers, lighting levels, noise levels, smell, vibration, and temperature, and the like.

Still further, the 3D renderings and audio effects generate an exaggerated perspective of a situation that makes the lesson more believable as an actual live event, instead of a recording or simulation of an event, and thereby make the training more memorable.

Still further, multiple mobile devices may be configured to enable a single supervisor, instructor, or customer representative to provide multiple training sessions in parallel.

Still further, a user could be prompted with 3D animated renderings to choose among a series of options, including at least one of a multiple-choice question that represents real-world strategies to resolve a situation presented in a lesson. By way of example, a water spill scenario could show three options: a mop, a broom, and paper towels. Instead of rendering these options as merely text or images, they could be rendered as 3D objects. When selected, the objects would be animated to show the result of the use of that tool. Selecting the broom would show the broom moving the water back and forth, but no progress made in collecting the water. Selecting the mop would show the mop circling the spill and absorbing the liquid. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A training system comprising:
    a mobile computing device ("MCD") having a processor and a memory configured for storing an application software program executable by the processor;
    a camera mounted on the MCD and configured for capturing an image of an object having a trigger image having a fixed location and orientation;
    position sensors mounted on the MCD for generating data indicative of a location and orientation of the MCD relative to the object, and for storage of same in memory;
    a display operative by the processor;
    augmented reality ("AR") sequence definitions stored in the memory and accessible by the program for defining steps of a lesson; and
    digital assets accessible by the AR sequence definitions;
    wherein the program is executable by the processor for detecting the trigger image and determining the fixed location and orientation of the trigger image and, with reference to an AR sequence definition and data input from the camera and MCD location and orientation data from the position sensors, for overlaying an image from the camera with the digital assets to thereby generate an AR image, for adjusting the digital assets of the AR image in location and orientation relative to the object, and for displaying an adjusted image on the display.

2. The system of claim 1 wherein the camera captures a live view of a trainee's actual environment.

3. The system of claim 1 wherein the camera captures a live view of a trainee's actual environment, incorporating elements of the actual environment into the view, wherein elements include at least one of objects, equipment, employees, customers, lighting levels, noise levels, and vibration.

4. The system of claim 1, wherein digital assets includes at least one of 2D and 3D objects, audio clips, video clips, static images, text data, animations, and hyperlinks.

5. The system of claim 1 further comprising multiple mobile devices configured to enable a single supervisor, instructor, or customer representative to provide multiple training sessions in parallel.

6. The system of claim 1 wherein the trigger image comprises a trigger image tag having at least one of a barcode and a QR code.

7. A method of training using a mobile computing device ("MCD"), the method comprising steps, executed by the MCD, of:

capturing with the MCD an original image of an object and its environment, the object including a trigger image;

recognizing the object and trigger image, wherein the trigger image has a fixed location and orientation;

determining the fixed location and orientation of the trigger image;

detecting a location and orientation of the MCD;

calling up one or more digital assets;

generating an augmented reality ("AR") image that simulates a problem of a given situation, the AR image being generated by superimposing the one or more digital assets over the original image;

adjusting the one or more digital assets of the AR image with reference to the location and orientation of the MCD such that the one or more digital assets' location and orientation appears fixed with respect to the object; and displaying the AR image to a trainee.

8. The method of claim 7, wherein the original image includes a live view of a trainee's actual environment, incorporating elements of the actual environment into the view, wherein elements include at least one of objects or equipment, other employees, customers, lighting levels, noise levels, and vibration.

9. The method of claim 7, wherein digital assets includes at least one of 2D and 3D objects, audio clips, video clips, static images, text data, animations, and hyperlinks.

10. The method of claim 7, further comprising a step of prompting the trainee to answer questions that test the trainee's understanding of material based on the situation.

11. The method of claim 7, further comprising a step of prompting the trainee with 3D animated renderings to choose among a series of options, including at least one of a multiple-choice question that represents real-world strategies to resolve a situation presented in a lesson.

12. The method of claim 7, further comprising a step of prompting the trainee to answer questions that test the trainee's understanding of material based on the situation, wherein the questions include 3D-rendered objects that simulate options available to address the problem of the given situation.

13. The method of claim 7, further comprising a step of prompting the trainee to answer questions that test the trainee's understanding of material based on the situation, wherein correct responses to questions include 3D animated renderings and audio effects to simulate the result of one or more correct responses in a multiple-choice question, and illustrating to the trainee how one or more correct responses cause the problem to be solved or ill effects to be minimized.

14. The method of claim 7, further comprising a step of prompting the trainee to answer questions that test the trainee's understanding of material based on the situation, wherein incorrect responses to questions include 3D animated renderings and audio effects to simulate the result of an incorrect choice in a multiple-choice question, and illustrating to the trainee how an incorrect choice either has no effect on a problem, or causes the problem to get worse than when it was originally simulated, or causes another problem to arise that is potentially worse than the problem originally simulated.

15. The method of claim 7, further comprising a step of prompting the trainee to answer questions that test the trainee's understanding of material based on the situation, wherein, when the trainee chooses an incorrect option, the application flows into a remediation loop, which remediation loop displays the relevant training material to the trainee once again, optionally in a different order, format, or style, adapting to the trainee's personal learning style and preferences.

16. The method of claim 7, further comprising a step of prompting the trainee to answer questions that test the trainee's understanding of material based on the situation, wherein, when the trainee chooses a correct option, the application simulates the effect of eliminating the problem or reducing the problem to a manageable level, thus providing feedback to the trainee as a reward for having made the correct choice.

17. The method of claim 7, further comprising a step of prompting the trainee to answer questions that test the trainee's understanding of material based on the situation, wherein the trainee has available multiple correct choices, one or more of which may be selected, each of which choices can reduce or eliminate the problem, and not necessarily in the same way as other correct options.

18. A training method comprising steps of:
displaying on a mobile computing device ("MCD") a live view of an object and surrounding environment;
detecting a trigger image having a fixed location and orientation and comprising at least one of a barcode and a QR code;
detecting the fixed location and orientation of the trigger image;
superimposing 3D animated renderings and audio effects over the live view to thereby generate a superimposed view;
adjusting automatically one or more digital assets of the superimposed view with reference to location and orientation of the object such that the location and orientation of the one or more digital assets appears fixed with respect to the object; and
prompting, with the superimposed view, a trainee to follow a pre-defined sequence of steps required to perform a particular procedure as required for a training lesson.

19. The training method of claim 18, further comprising steps of:
reading by the trainee of a description of at least one particular step; and
interacting with objects displayed on the MCD to trigger an animation or visualization of the at least one particular step.

20. The training method of claim 18, further comprising the step of guiding the trainee from one step to the next, in exactly the correct order as required by a procedure and as built into an application.

21. The training method of claim 18, further comprising the step wherein, upon completion of an entire sequence of steps, simulating a final result of a procedure as a set of 3D renderings and audio effects superimposed on the live view, the audio effects being played through speakers incorporated into the MCD, thereby providing feedback to the trainee.

* * * * *